United States Patent [19]

Frankfurt

[11] Patent Number: 4,931,629

[45] Date of Patent: Jun. 5, 1990

[54] SECURITY CREDIT CARD

[76] Inventor: Robert Frankfurt, 498 Kenaston Ave. T.M.R., Quebec, Canada, H3R-1M9

[21] Appl. No.: 209,685

[22] Filed: Jun. 21, 1988

[30] Foreign Application Priority Data

Apr. 29, 1988 [CA] Canada .................................. 565585

[51] Int. Cl.[5] .............................................. G06K 19/02

[52] U.S. Cl. .................................... 235/488; 235/382; 235/487

[58] Field of Search ......................... 235/382, 488, 487

[56] References Cited

U.S. PATENT DOCUMENTS 4,303,852 12/1981 Silverman .......................... 235/382

*Primary Examiner*—Harold I. Pitts

*Attorney, Agent, or Firm*—Laff, Whitesel, Conte & Saret

[57] ABSTRACT

An unique credit card which can be registered to the holder and is virtually as unique as a finger print. A preferred embodiment of the invention is a credit card comprising a plastic base layer containing one or more distinctive gems retained thereto. Preferably the gem or gems are contained within receptacles in the plastic base layer. The distinctiveness of the gems can be recorded against the name of the proper holer, and fraudulent possession of the card detected.

15 Claims, 1 Drawing Sheet

SECURITY CREDIT CARD

BACKGROUND OF THE INVENTION

This invention relates to a credit card, and particularly to one which has high security.

Credit cards have often been subject to fraud. One manner of committing the fraud is to fabricate fake credit cards. A technique for foiling this is to make manufacture of credit cards more difficult. In recent years credit cards have been made to include holograms, which require specialized equipment difficult for unscrupulous characters to obtain.

However a person wishing to commit the fraud can steal already prepared cards, which have as yet not been embossed with the user's name and credit card number. Therefore the possibility of fraud still exists. Another problem involving fraudulant use of credit cards is theft of a legitimate credit card.

The present invention is directed to an unique credit card which can be registered to the holder and is virtually as unique as a finger print. Thus the possession of a stolen card or one already registered to the holder can be determined and proven to be the property of another person.

In accordance with the present invention a credit card is comprised of a plastic base layer which contains one or more distinctive gems retained thereto. Since, for example, no two gems such as diamonds are alike, the gems can be recorded as unique to one credit card holder. The unique light scatter pattern or characteristic of the gem can be determined, which pattern or characteristic can be recorded corresponding to the name of a credit card holder. The possibility of fraud is thus substantially reduced.

The distinctiveness of each gem can be recorded separately from the card by the credit card company, and then matched with a particular card when it is issued, the correspondence being stored in a database. Security of the card thus stems from the existance of the gem card holder database retained by the credit card company. Should blank cards be stolen, they will not contain the gems and the card would be clearly fraudulent. Even embossing the card with a fake name and number would not result in a legitimate card, absent the distinctive gem or gems.

Further, even if the person stealing the blank card embosses the card with a name and number which would be recognizable by the credit card company, and separately stole and inserted gems into the card, it would be impossible for the person making up the fraudulant card to match the gems to the database. The fraudulency of the card can thus be determined by reading the light scatter pattern or characteristic of the card and comparing it with the database listing.

SUMMARY OF THE INVENTION

In summary, therefore, a preferred embodiment of the invention is a credit card comprising a plastic base layer containing one or more distinctive gems retained thereby. Preferably the gem or gems are contained within receptacles in the plastic base layer.

BRIEF DESCRIPTION OF THE DRAWINGS

A better understanding of the invention will be obtained by reference to the detailed description below, in conjunction with the following drawings, in which.

DESCRIPTION OF THE PREFERRED EMBODIMENT

Figure 1:
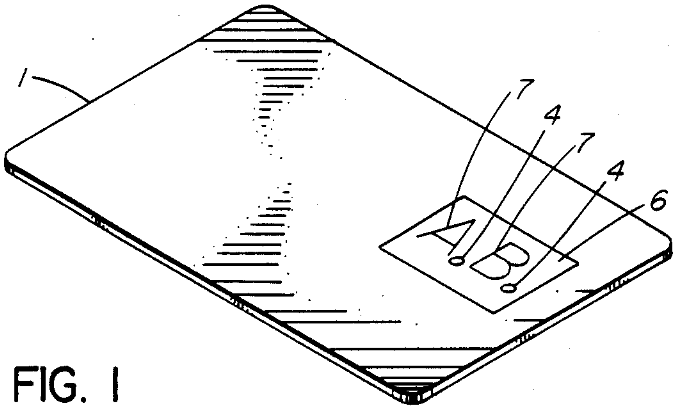
FIG. 1 is a perspective view of an embodiment of the present invention.
Figure 2:
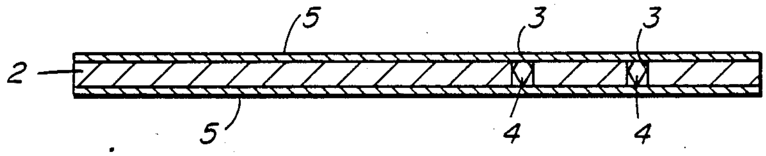
FIG. 2 is a cross-section of one embodiment of the present invention.
Figure 3:
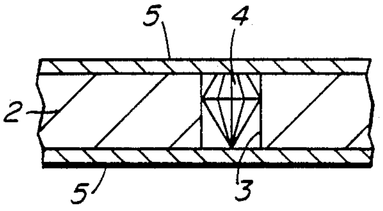
FIG. 3 is an enlargement of a portion of the cross-section of FIG. 2.

Referring now to FIGS. 1, 2 and 3, a credit card 1 is formed of a plastic base layer 2 containing one or more holes 3. Within the holes are disposed distinctive gems 4. Covering at least the region adjacent the holes, but preferably over the entire plane surfaces of the credit card, are transparent sealing layers 5 (preferably formed of plastic), which secure the gem or gems in the holes.

It should be noted that while the above-described embodiment retains the gems within holes, it is possible that they could be embossed into the plastic under pressure, then preferably sealed by the transparent sealing layer over the gem from the embossing direction.

Preferably the gem 4 is a diamond, e.g. of 1 point in weight. A cut diamond contains 36 facets, and has a top surface referred to as the table. As no two diamonds are alike due to variations in the width of the table and slight variations in the angle between the facets, every diamond has a distinctive light scattering pattern. Recording of the light scattering pattern provides a permanent record of the uniqueness of the diamond, and this record can be retained by the credit card company being as unique as a finger print to the credit card holder. The use of several diamonds increasing the distinctiveness of the card, and decreases the likelihood of misinterpreting the characteristic of only one.

It should be noted that other distinctive gems can be used, such as emeralds, rubies, sapphires, semi-precious stones, rhinestones, or metal (which can be formed to appear as a gem, and thus is defined herein as such).

Figure 4:
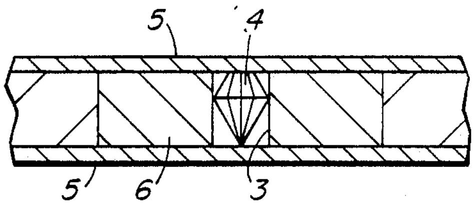
FIG. 4 is an enlargement of the cross-section of FIG. 2 illustrating a second embodiment.

FIG. 4 illustrates the enlarged cross-section of the invention in accordance with a second embodiment. In this embodiment a region of the credit card contains and surrounds a metallic inlaid region 6. The metallic inlaid region contains a hole or holes 3, in which the gem 4 is retained. Transparent sealing layers 5 retain the gem in position, as well as the metallic inlay region.

The metallic inlay region is preferably gold foil of similar thickness as the credit card (e.g. about 0.6 mm), but can be silver foil or platinum foil if desired.

The sealing layer 5 can be heat embossed to the card, protecting it, retaining the gems 4 and the metallic inlay region 6 (if used), and allow imprinting on the card to be visible. The thickness of each sealing layer can be e.g. about 0.06 mm.

Insignia such as the initials of the credit card holder can be engraved in the metallic foil as shown at reference numeral 7 (FIG. 1). The gems can be located at any position within the metallic inlay region, but preferably are at locations forming periods of each letter of the initials, as shown. While FIG. 1 shows inlay region 6 visible through the upper transparent sealing layer, in the case in which the embodiment as shown in FIG. 3 is used, the rectangle shown as reference numeral 6 in FIG. 1 can merely be imprinted, either with gold or another color.

Indeed, the card can be used with a hologram, and the gems located at any convenient place on the card.

Figure 5:
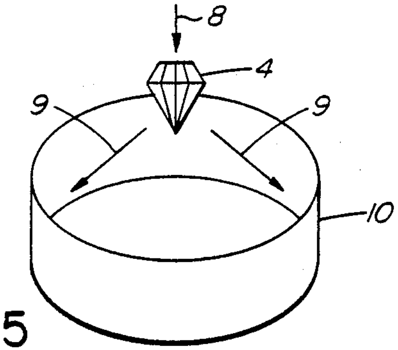
FIG. 5 is a perspective view illustrating how the gem can be identified.

FIG. 5 illustrates how distinctiveness of the diamond or other gem is to be determined. The gem 4 is retained and a preferably monochromatic light such as a laser beam is directed against the table of the gem as in the direction of arrow 8. The light is internally defracted, and exits out of the facets along the direction of arrows 9, which for the sake of ease of illustration do not illustrate all of the directions. A cylindrical photographic film 10 having its internal face photosensitive is located around the gem 4, to receive the defracted light. A pulse of the light 8 is sufficient to expose film 10, the pulse length being dependent on the sensitivity of the film, which is then developed. The resulting recorded light pattern can be read by an electronic photosensor, digitized and stored as a digital number in a digital memory such as a magnetic tape, floppy disc, etc.

In case of suspected theft the classified gem can be removed from the credit card and run through the same test as described above. A match of the stored digital number as related to a legitimate credit card holder in the database provides evidence of who the credit card was actually issued to.

Of course, rather than a photographic film, other photosensitive means can be used to record the light scatter pattern from the gem, such as electronic light sensors, etc.

It should also be noted that the presence of the gems give the credit card a high quality look (enhanced by the gold or other metallic inlay) and serves as a warning to potential thieves that the card has enhanced security and that the fraudulently used card can be detected. The mere presence of the gems thus acts as a deterrent.

A person understanding this invention may now conceive of various alternatives or structures using the principles described herein. All are considered to be within the sphere and scope of the invention as defined in the claims appended hereto.

I claim:

1. A credit card comprising a plastic base layer and one or more distinctive gems retained thereby.

2. A credit card as defined in claim 1 in which the gem or gems are contained within receptacles in the plastic base layer.

3. A credit card as defined in claim 2 in which the base layer contains holes containing the gem or gems therein, and further including transparent sealing layers over the surfaces of the base layer at least over the region adjacent the holes for securing the gem or gems in the holes.

4. A credit card as defined in claim 3 in which the transparent sealing layers cover the entire plane surfaces of the credit card.

5. A credit card as defined in claim 1 in which the plastic base layer contains and surrounds a metallic inlay region, the metallic inlay region containing one or more of said holes, and said gems being contained within the holes.

6. A credit card as defined in claim 5 in which transparent sealing layers cover the entire plane surfaces of the credit card.

7. A credit card as defined in claim 6 including insignia of a credit card holder engraved in the metallic inlay region, the gems being located a predetermined location relative to the insignia.

8. A credit card as defined in claim 1, 3 or 6 in which the gem or gems are cut diamonds.

9. A credit card as defined in claim 1, 3 or 6 in which the gem or gems are selected from the group consisting of cut diamonds, emeralds, rubies, sapphires, semi-precious stones, rhinestones and metal.

10. A credit card as defined in claim 5, 6 or 7 in which the gem or gems are cut diamonds, and in which the metallic inlay region is gold.

11. A credit card as defined in claim 5, 6 or 7 in which the gem or gems are cut diamonds, and in which the metallic inlay region is silver.

12. A credit card as defined in claim 5, 6 or 7 in which the gem or gems are cut diamonds, and in which the metallic inlay region is platinum.

13. A credit card as defined in claim 5, 6 or 7 in which the gem or gems are selected from the group consisting of cut diamonds, emeralds, rubies, sapphires, semi-precious stones, rhinestones and metal, and in which the metallic inlay region is gold.

14. A credit card as defined in claim 5, 6 or 7 in which the gem or gems are selected from the group consisting of cut diamonds, emeralds, rubies, sapphires, semi-precious stones, rhinestones and metal, and in which the metallic inlay region is silver.

15. A credit card as defined in claim 5, 6 or 7 in which the gem or gems are selected from the group consisting of cut diamonds, emeralds, rubies, sapphires, semi-precious stones, rhinestones and metal, and in which the metallic inlay region is platinum.

* * * * *